US009961145B1

United States Patent
(12) United States Patent
Faibish et al.

(10) Patent No.: US 9,961,145 B1
(45) Date of Patent: May 1, 2018

(54) MULTI-TIER STORAGE SYSTEM HAVING FRONT-END STORAGE TIER IMPLEMENTED UTILIZING SOFTWARE-DEFINED STORAGE FUNCTIONALITY

(71) Applicant: EMC Corporation, Hopkinton, MA (US)

(72) Inventors: Sorin Faibish, Newton, MA (US); Uday Gupta, Westford, MA (US); John M. Bent, Los Alamos, NM (US); Dennis Ting, Jr., Groton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 236 days.

(21) Appl. No.: 14/973,245

(22) Filed: Dec. 17, 2015

(51) Int. Cl.
*G06F 15/16* (2006.01)
*H04L 29/08* (2006.01)
*G06F 15/167* (2006.01)

(52) U.S. Cl.
CPC ........ *H04L 67/1097* (2013.01); *G06F 15/167* (2013.01); *H04L 67/16* (2013.01); *H04L 67/2842* (2013.01)

(58) Field of Classification Search
CPC ............................ H04L 67/1097; H04L 67/16
USPC ........................................... 709/219; 717/114
See application file for complete search history.

(56) References Cited

U.S. PATENT DOCUMENTS 8,620,962 B1 * 12/2013 Strunk .............. G06F 17/30094 707/797
9,652,161 B2 * 5/2017 Mehra .................. G06F 3/0619
2013/0227194 A1 8/2013 Kannan et al.
2013/0282994 A1 * 10/2013 Wires ................... G06F 3/0604 711/158
2013/0290636 A1 * 10/2013 Chen .................. G06F 12/0811 711/122

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Duyen Doan
(74) *Attorney, Agent, or Firm* — Ryan, Mason & Lewis, LLP

(57) ABSTRACT

An apparatus in one embodiment comprises a multi-tier storage system having at least a front-end storage tier and a back-end storage tier. The storage system comprises a software-defined storage controller configured to implement the front-end storage tier as a unified memory cluster accessible to respective processors of a plurality of compute nodes. The software-defined storage controller is implemented using at least one processing device comprising a processor coupled to a memory. The unified memory cluster in some embodiments comprises portions of respective memories of at least a subset of the compute nodes. The portions of respective memories of at least a subset of the compute nodes may comprise, for example, respective flash memories of those compute nodes, or respective dynamic random access memories of those compute nodes. Other illustrative embodiments include systems, methods and processor-readable storage media.

20 Claims, 8 Drawing Sheets

(56) References Cited

U.S. PATENT DOCUMENTS

2014/0173199 A1* 6/2014 Gupta .............. G06F 17/30221 711/117
2015/0312366 A1* 10/2015 Ben-Yehuda .......... H04L 67/10 709/213
2016/0070494 A1* 3/2016 Barnes ................ H04L 67/1097 711/104

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.
EMC Corporation, "EMC ScaleIO," V1.32, User Guide, #302-001-033, Rev. 11, May 2015, 536 pages.
EMC Corporation, "EMC 2-TIERS—POSIX Namespace for 2nd and 3rd Platform Storage Systems," Dec. 2015, 3 pages.
J. Hilland et al., "RDMA Protocol Verbs Specification (Version 1.0)," draft-hillard-iwarp-verbs-v1.0, Apr. 2003, 243 pages.
EMC Corporation, "EMC Elastic Cloud Storage—Software-Defined Object Storage—Cloud-Scale Capabilities and Economics," EMC Data Sheet, Oct. 2015, 4 pages.
EMC Corporation, "EMC ATMOS Cloud Storage—A Platform to Store, Archive, and Access Unstructured Data at Scale—Data, Application, Access Demands," EMC Data Sheet, Sep. 2014, 3 pages.
EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.
EMC Corporation, "EMC Scaleio Operation Overview—Ensuring Non-Disruptive Operation and Upgrade," EMC White Paper, Mar. 2015, 10 pages.
U.S. Appl. No. 14/871,160, filed in the name of S. Faibish et al. on Sep. 30, 2015 and entitled "Translation-Based Name Node Configuration for Object Access in a Multi-Tier Storage System."
Adam Moody, "Overview of the Scalable Checkpoint / Restart (SCR) Library," S&T Principal Directorate—Computation Directorate, Oct. 14, 2009, 33 pages.

* cited by examiner

100
COMPUTE NODE
102-1
102-2
102-N
PROCESSOR
104-1
104-2
104-N
MEMORY
106-1
106-2
106-N
108-1
108-2
108-N
FAST TIER
110
SOFTWARE-DEFINED STORAGE CONTROLLER
112
DATA MOVER MODULES
114
CAPACITY TIER
116
OBJECT STORE
118

MULTI-TIER STORAGE SYSTEM HAVING FRONT-END STORAGE TIER IMPLEMENTED UTILIZING SOFTWARE-DEFINED STORAGE FUNCTIONALITY

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include multi-tier storage systems in which a front-end storage tier is implemented as a unified memory cluster utilizing software-defined storage functionality. For example, a given unified memory cluster may be implemented under software-defined storage control using respective portions of memories of compute nodes, IO nodes or other types of nodes of the information processing system.

In one embodiment, an apparatus comprises a multi-tier storage system having at least a front-end storage tier and a back-end storage tier. The storage system comprises a software-defined storage controller configured to implement the front-end storage tier as a unified memory cluster accessible to respective processors of a plurality of compute nodes. The software-defined storage controller is implemented using at least one processing device comprising a processor coupled to a memory.

By way of example, the unified memory cluster in some embodiments comprises portions of respective memories of at least a subset of the compute nodes. The portions of respective memories of at least a subset of the compute nodes may comprise, for example, respective flash memories of those compute nodes, or respective dynamic random access memories of those compute nodes.

It is also possible, for example, that respective memories of one or more IO nodes separate from but associated with respective ones of the compute nodes may be used to form at least a portion of the unified memory cluster.

The software-defined storage controller may be implemented in a distributed manner so as to comprise software-defined storage modules implemented on at least a subset of the compute nodes, and/or on one or more IO nodes that are associated with but separate from respective ones of the compute nodes. For example, a distributed software-defined storage controller may comprise one or more software-defined storage modules implemented on respective ones of one or more of the compute nodes and one or more software-defined storage modules implemented on respective ones of one or more IO nodes that are associated with but separate from respective other ones of the compute nodes.

The software-defined storage modules of a distributed software-defined storage controller are illustratively implemented in respective Linux containers running on respective ones of the compute nodes or associated IO nodes.

In some embodiments, the front-end storage tier comprises a fast tier in a 2 TIERS™ storage system, although other types of multi-tier storage systems can be used in other embodiments.

Illustrative embodiments can provide significant improvements in terms of data access performance and scalability relative to conventional arrangements. For example, reduced data access latency can be provided and larger numbers of nodes supported than in conventional front-end storage tier implementations. Similar advantages are provided for other multi-tier storage system arrangements.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
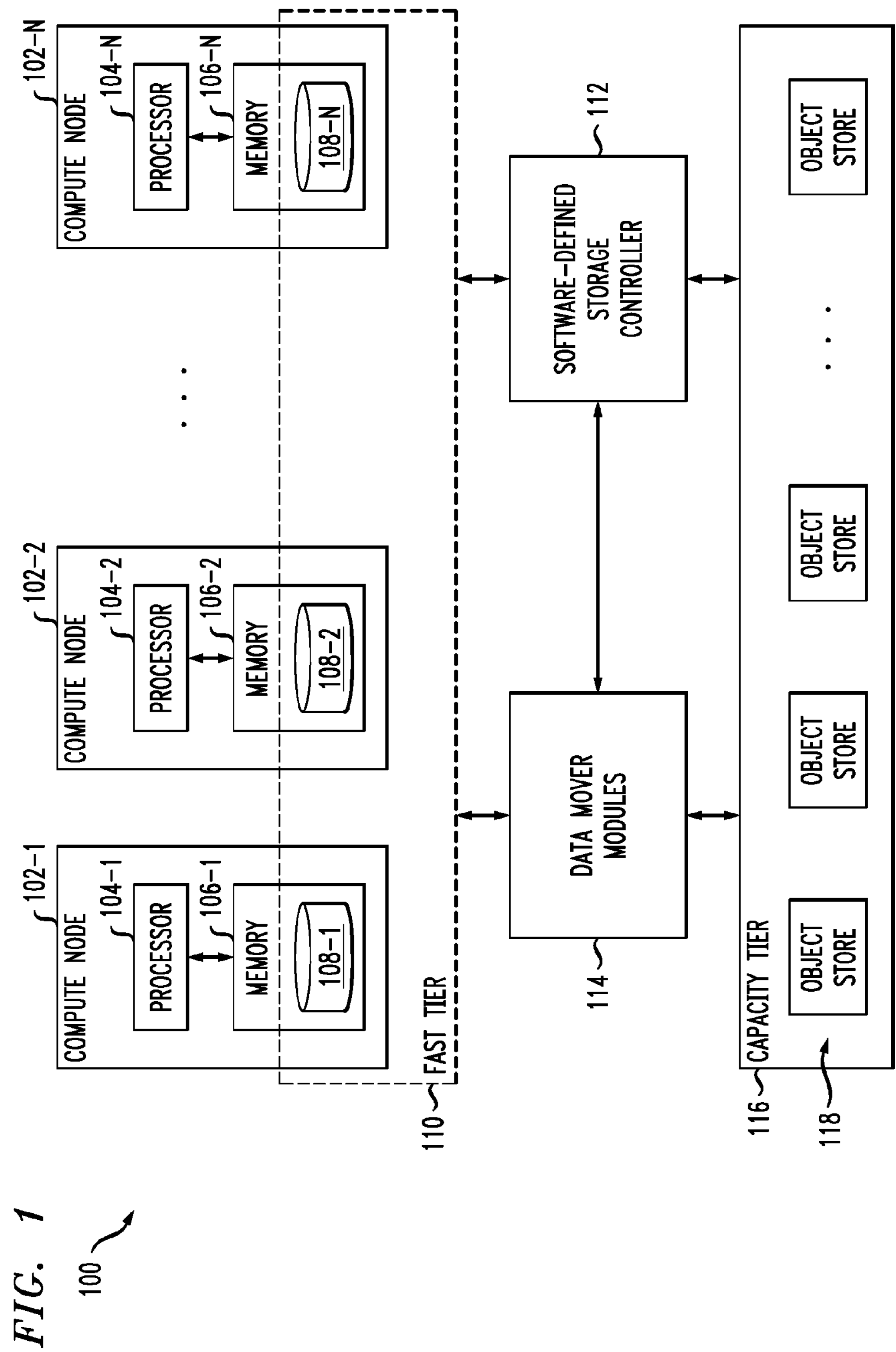
FIG. 1 is a block diagram of an information processing system comprising a multi-tier storage system in which a front-end storage tier is implemented using software-defined storage functionality in an illustrative embodiment of the invention.

FIG. 1 shows an information processing system 100 configured in accordance with an illustrative embodiment of the present invention. The information processing system 100 comprises compute nodes 102-1, 102-2, . . . 102-N comprising respective processors 104-1, 104-2, . . . 104-N coupled to respective memories 106-1, 106-2, . . . 106-N. Portions 108-1, 108-2, . . . 108-N of the respective memories 106-1, 106-2, . . . 106-N collectively comprise a fast tier 110 of a multi-tier storage system. The fast tier 110 is an example of what is more generally referred to herein as a "front-end storage tier" of the multi-tier storage system. Other types of front-end storage tiers can be used in other embodiments.

The fast tier 110 is implemented under the control of a software-defined storage controller 112. The fast tier 110 thus comprises portions 108 of respective memories 106 of the compute nodes 102. The fast tier 110 is accessible as a unified memory cluster to the respective processors 104 of the compute nodes 102.

The unified memory cluster in this embodiment serves as a single common storage pool utilized by all of the compute nodes 102. The software-defined storage controller 112 is configured to implement the fast tier 110 as the unified memory cluster accessible to respective processors 104 of the compute nodes 102.

The compute nodes 102 in some embodiments comprise respective analysis nodes that run respective analytics applications utilizing data stored in the fast tier 110 and one or more other tiers of the multi-tier storage system. Numerous other types of compute nodes can be used in other embodiments, including various combinations of multiple compute nodes of different types. For example, at least a subset of the compute nodes 102 in some implementations can comprise virtual machines or containers running in cloud infrastructure.

The fast tier 110 in some embodiments incorporates or otherwise supports analytics functionality utilized by the compute nodes 102. For example, the fast tier 110 may comprise an in-memory database analytics engine such as SAP HANA that comprises a relational database management system.

The analytics functionality can alternatively be provided using in-memory data analytics products such as Tachyon. Numerous other types of analytics functionality can be provided using fast tier 110 in other embodiments.

Also, the unified memory cluster provided by the portions 108 comprising the fast tier 110 is assumed to have an associated file system. For example, an XFS file system or other type of file system can be built on top of the unified memory cluster. Such a file system can be used, for example, to support Tachyon in-memory data analytics or other types of in-memory data analytics functionality of the fast tier 110.

The portions 108 of the respective memories 106 of the compute nodes 102 may comprise, for example, respective flash memories of the compute nodes 102. Alternative arrangements are possible. For example, the portions 108 of the respective memories 106 of the compute nodes 102 may comprise respective dynamic random access memories (DRAMs), or various combinations of flash, DRAM or other types of electronic memory.

The compute nodes 102 in the present embodiment are assumed to be interconnected with one another using high-speed connections. For example, data can be moved between the compute nodes 102 using remote direct memory access (RDMA) connections over InfiniBand or Gigabit Ethernet. Numerous other types of connections and associated data transfer protocols can be used in other embodiments.

The software-defined storage controller 112 is assumed to be part of a storage system that in the FIG. 1 embodiment further comprises data mover modules 114 and a capacity tier 116. Such a storage system or individual portions thereof are further assumed to be configured for communication with the compute nodes 102 over at least one network although such networks are not explicitly shown in the figure. The capacity tier 116 is an example of what is more generally referred to herein as a "back-end storage tier" of the multi-tier storage system. Other types of back-end storage tiers can be used in other embodiments.

The software-defined storage controller 112 in some embodiments is implemented using software-defined storage products such as ScaleIO™ or ViPR® both of which are commercially available from EMC Corporation of Hopkinton, Mass.

For example, implementations utilizing ScaleIO™ for the software-defined storage controller can advantageously support hundreds or thousands of compute nodes, potentially providing a single memory pool with a capacity on the order of a petabyte (PB). Such an arrangement overcomes scalability limitations inherent in certain conventional systems used to implement in-memory data analytics functionality with SAP HANA or Tachyon. Also, failure protection functionality provided by ScaleIO™ can be used to protect the fast tier 110 from failures in one or more of the compute nodes 102.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The data mover modules 114 are illustratively configured to move data between the fast tier 110 and the capacity tier 116. The capacity tier 116 illustratively comprises a plurality of object stores 118, although in other embodiments could comprise only a single object store, or other types of storage. Each of the object stores 118 is configured to store data in the form of objects having respective object identifiers (OIDs).

A specified set of objects stored in a given one of the object stores 118 may be made accessible to an application running on a given one of the compute nodes 102 via a corresponding dynamically loadable namespace (DLN) identifier. The DLN identifier is associated with a DLN object stored in the given object store, with the DLN object comprising identifiers of respective ones of the objects in the specified set.

In some embodiments, a translator at least partially incorporated in or otherwise associated with the multi-tier storage system implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of the given object store 118 of the capacity tier 116 are made accessible to the application via the name node. The translator via the translation services and the at least one index table permits applications running on respective compute nodes having no knowledge of the object storage structure of the given object store to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed and entitled "Translation-Based Name Node Configuration for Object Access in a Multi-Tier Storage System," which is commonly assigned herewith and incorporated by reference herein.

It should be noted that software-defined storage may also be used for one or more of the object stores 118 or other portions of the capacity tier 116. In such an arrangement, first and second different sets of software-defined storage parameters can be used to respective ones of the fast and capacity tiers.

The fast tier 110, software-defined storage controller 112, data mover modules 114 and capacity tier 116 are all assumed to be part of the multi-tier storage system of information processing system 100, although other arrangements are possible in other embodiments. Also, it should be noted that components such as software-defined storage controller 112 and data mover modules 114 that are shown as separate from the fast tier 110 and capacity tier 116 in the FIG. 1 embodiment can be implemented at least in part within at least one of the tiers. For example, as will be described elsewhere herein, the software-defined storage controller 112 can be implemented in a distributed manner using the compute nodes 102 or associated IO nodes that are separate from those compute nodes. The data mover modules 114 can similarly be implemented in a distributed manner using the same compute or IO nodes that are used to implement portions of the fast tier 110.

A given "IO node" as the term is used herein is intended to encompass a data node, a metadata node, or another type of node providing access to at least one of data and metadata for one or more associated compute nodes. The term "compute node" is also intended to be broadly construed, and generally encompasses a system node that runs at least a portion of at least one application.

It is assumed that the fast tier 110 has a relatively high input-output processing speed and a relatively low capacity and the capacity tier 116 has a relatively low input-output processing speed and a relatively high capacity, although other types of multi-tier storage systems can be used in other embodiments.

A given multi-tier storage system illustratively comprises multiple hierarchical storage tiers for use in hierarchical storage management (HSM). A data mover module is illustratively coupled to the storage tiers and configured to control transfer of data between the storage tiers. The term "data movement" as used in this and other contexts herein is intended to be broadly construed, so as to encompass data migration as well as other types of movement of data between storage tiers. A given data mover module can be implemented at least in part on storage arrays or other storage platforms that implement at least portions of one or more of the storage tiers of the multi-tier storage system.

Each of at least a subset of the storage tiers of a multi-tier storage system comprises a plurality of storage drives with different types of storage drives being used in different ones of the storage tiers. For example, a fast tier may comprise flash drives while a capacity tier comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The storage drives utilized in the fast tier 110 are generally significantly faster in terms of read and write access times than the drives utilized in a capacity tier. Accordingly, the fast tier 110 in some embodiments is a relatively small storage tier optimized for IO processing speed, while the capacity tier 116 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged as respective front-end and back-end storage tiers. Accordingly, numerous alternative storage tiering arrangements can be used in other embodiments. Such alternative arrangements can include, for example, one or more intermediate storage tiers arranged between the front-end and back-end storage tiers of a multi-tier storage system.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 110 and the capacity tier 116 of the multi-tier storage system are implemented in the form of a 2 TIERS™ storage system from EMC Corporation of Hopkinton, Mass.

By way of example, a given 2 TIERS™ storage system may comprise fast tier 110 implemented using DSSD™ server-based flash storage devices, also from EMC Corporation, and capacity tier 116 comprising object stores 118. In such an arrangement, an IO dispatcher software layer of the 2 TIERS™ storage system may be configured, for example, to pre-fetch data from one or more of the object stores 118 of the capacity tier 116 into the DSSD™ storage devices of the fast tier 110.

It should be noted that access predictions or other hints provided using analytics applications associated with in-memory data analytics products such as Tachyon can be utilized by the IO dispatcher software layer of the 2 TIERS™ storage system to provide the fastest possible access to needed data files.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 114 may be configured to control movement of data between portions 108 of fast tier 110 and the capacity tier 116 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 114 can communicate with the compute nodes 102, software-defined storage controller 112 and capacity tier 116 via one or more networks or other types of communication media. In distributed implementations, different modules or other portions of a given distributed system component such as software-defined storage controller 112 or data mover modules 114 can be implemented in respective ones of the compute nodes 102 or associated IO nodes that are separate from those compute nodes.

As noted above, the compute nodes 102 are assumed to communicate with the storage system over at least one network, which is not explicitly shown in the figure. The compute nodes 102 may comprise respective computers in a cluster of computers associated with a supercomputer or other high performance computing (HPC) system. The term "compute node" as used herein is intended to be broadly construed, and such nodes in some embodiments may comprise respective analysis nodes or other types of compute nodes. Applications running on such nodes illustratively include what are referred to herein as "analysis applications" but such applications are also intended to be broadly construed.

Although shown as a separate component in this embodiment, the software-defined storage controller 112 in other embodiments can be implemented at least in part within the fast tier 110, the capacity tier 116 or within another system component.

As indicated previously, it is possible to implement the software-defined storage controller 112 in a distributed manner, with portions of the software-defined storage controller 112 possibly being implemented on respective ones of the compute nodes 102 or associated processing platforms. Other types of distributed implementations of the software-defined storage controller 112 are possible. For example, at least a subset of the software-defined storage functionality of the controller 112 can be implemented on respective IO nodes that are associated with but separate from the compute nodes 102. The data mover modules 114 can similarly be implemented in a distributed manner, possibly using the same compute or IO nodes that are used to implement respective portions of the software-defined storage controller 112. The IO nodes may illustratively comprise respective servers.

It is to be appreciated that these and other features of illustrative embodiments are presented by way of example only, and should not be construed as limiting in any way.

Accordingly, different numbers, types and arrangements of compute nodes, front-end storage tiers, software-defined storage controllers, data mover modules and back-end storage tiers can be used in other embodiments.

The fast tier 110, software-defined storage controller 112, data mover modules 114, capacity tier 116 and possibly other elements of the system 100 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The software-defined storage controller 112 and data mover modules 114, as well as other system components, may be implemented at least in part using processing devices of such processing platforms.

For example, in a distributed implementation of the software-defined storage controller 112, the software-defined storage modules of the distributed software-defined storage controller are implemented in respective LXCs running on respective ones of the compute nodes or associated IO nodes.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising multiple storage tiers and an associated software-defined storage controller.

In step 200, a back-end storage tier of a multi-tier storage system is configured to include one or more object stores. In the context of the FIG. 1 embodiment, the back-end storage tier comprises capacity tier 116 having multiple object stores 118. Each object store stores objects in association with respective unique OIDs.

In step 202, a software-defined storage controller of the multi-tier storage system is utilized to configure a front-end storage tier of the multi-tier storage system as a unified memory cluster accessible to respective processors of a plurality of compute nodes. The unified memory cluster illustratively comprises portions of respective memories of at least a subset of the compute nodes. For example, with reference to FIG. 1, the software-defined storage controller 112 of information processing system 100 implements fast tier 110 comprising portions 108 of respective memories 106 of the compute nodes 102. In other embodiments, the unified memory cluster comprises portions of respective memories of IO nodes that are associated with but separate from respective ones of the compute nodes.

For example, the unified memory cluster may comprise portions of respective memories of one or more of the compute nodes and portions of respective memories of one or more IO nodes that are associated with but separate from respective other ones of the compute nodes. The portions of the respective memories of the compute nodes or the associated IO nodes illustratively comprise respective flash memories of those nodes, respective DRAMs of those nodes, or respective other types of electronic memories of those nodes, or respective combinations of two or more of flash, DRAM or other types of electronic memories of those nodes. The compute nodes or the associated IO nodes in some embodiments are configured to communicate with one another using RDMA connections.

As mentioned above, the software-defined storage controller in some embodiments comprises a ScaleIO™ software-defined storage controller or a ViPR® software-defined storage controller. Other types of software-defined storage controllers can be used in other embodiments, and such software-defined storage controllers can be part of or otherwise associated with a given storage system comprising at least one storage platform.

In step 204, the size of the unified memory cluster is dynamically modified under the control of the software-defined storage controller responsive to one or more designated conditions. For example, the unified memory cluster may be expanded using an additional portion of the memory of one of the compute or IO nodes responsive to an overflow event associated with the memory of another one of the compute or IO nodes.

In the context of the FIG. 1 embodiment, the size of the portion 108-*i* of the memory 106-*i* of compute node 102-*i* may be increased responsive to an overflow condition involving another portion 108-*k* of the memory 106-*k* of compute node 102-*k*, where i and k are distinct integer values in the range 1, 2, . . . N. Additionally or alternatively, the size of the portion 108-*i* of the memory 106-*i* of compute node 102-*i* may be increased responsive to an overflow condition involving that same particular portion. In other words, the size of the portion 108-*i* can be increased responsive to an overflow condition involving that portion by allocating part of any remaining allocable portion of memory 106-*i* to the portion 108-*i*. If there is no remaining allocable portion of memory 106-*i*, the portions of the memories of one or more other compute nodes can be increased to permit suitable expansion of the fast tier 110 responsive to the overflow condition involving the portion 108-*i* of the memory 106-*i*. It is also possible that one or more additional compute nodes may be added to the set of compute nodes having respective memories that comprise respective portions of the fast tier 110.

Conditions other than overflow events can be used to control expansion of the fast tier 110. The overflow events and other conditions are assumed to be monitored by the software-defined storage controller 112 so that it can take the appropriate actions responsive to such conditions. These actions may alternatively involve contracting the fast tier 110. For example, it is possible that one or more of the portions 108 respectively associated with one or more of the compute nodes 102 can be removed from the fast tier 110 under certain conditions.

The dynamic modification of the size of the unified memory cluster in step 204 is exemplary only, and additional or alternative actions may be taken in other embodiments. These include the above-noted potential contraction of the front-end storage tier under certain conditions, as well as various types of failure recovery.

For example, the unified memory cluster may be configured to recover from a failure in the memory of one of the compute or IO nodes by obtaining corresponding data from the memory of another one of the compute or IO nodes. With reference to the FIG. 1 embodiment, the fast tier 110 may be configured to recover from a failure in the memory of one of the compute nodes 102 by obtaining corresponding data from the memory of another one of the compute nodes 102. Such failure recovery is assumed to be directed at least in part by the software-defined storage controller 112. A wide variety of other types of configuration or control of the fast tier 110 can be provided by the software-defined storage controller 112.

Figure 2:
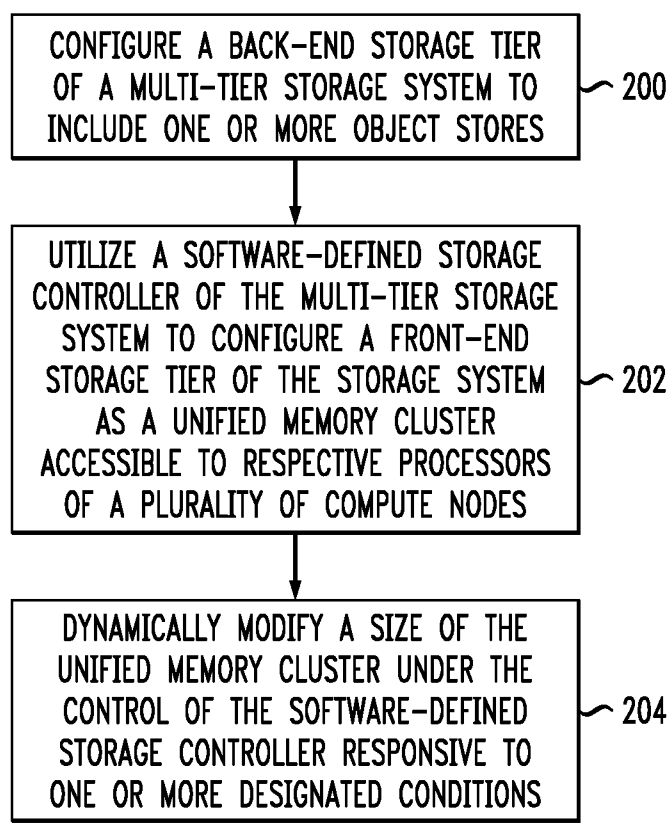
FIG. 2 is a flow diagram of an exemplary process for memory clustering of a front-end storage tier utilizing software-defined storage functionality in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a front-end storage tier implemented utilizing a software-defined storage controller. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different front-end storage tiers within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising compute nodes and a multi-tier storage system will now be described with reference to FIGS. 3 through 8. In each of these embodiments, a fast tier of a multi-tier storage system is configured by a software-defined storage controller to include respective portions of memories of compute nodes or associated IO nodes. Furthermore, the software-defined storage controller in each of these illustrative embodiments is implemented in a distributed manner utilizing a plurality of software-defined storage modules implemented on respective ones of the compute nodes or associated IO nodes. It is assumed that the distributed software-defined storage controller comprises a ScaleIO™ software-defined storage controller or a ViPR® software-defined storage controller, although other types of controllers could be used.

Figure 3:
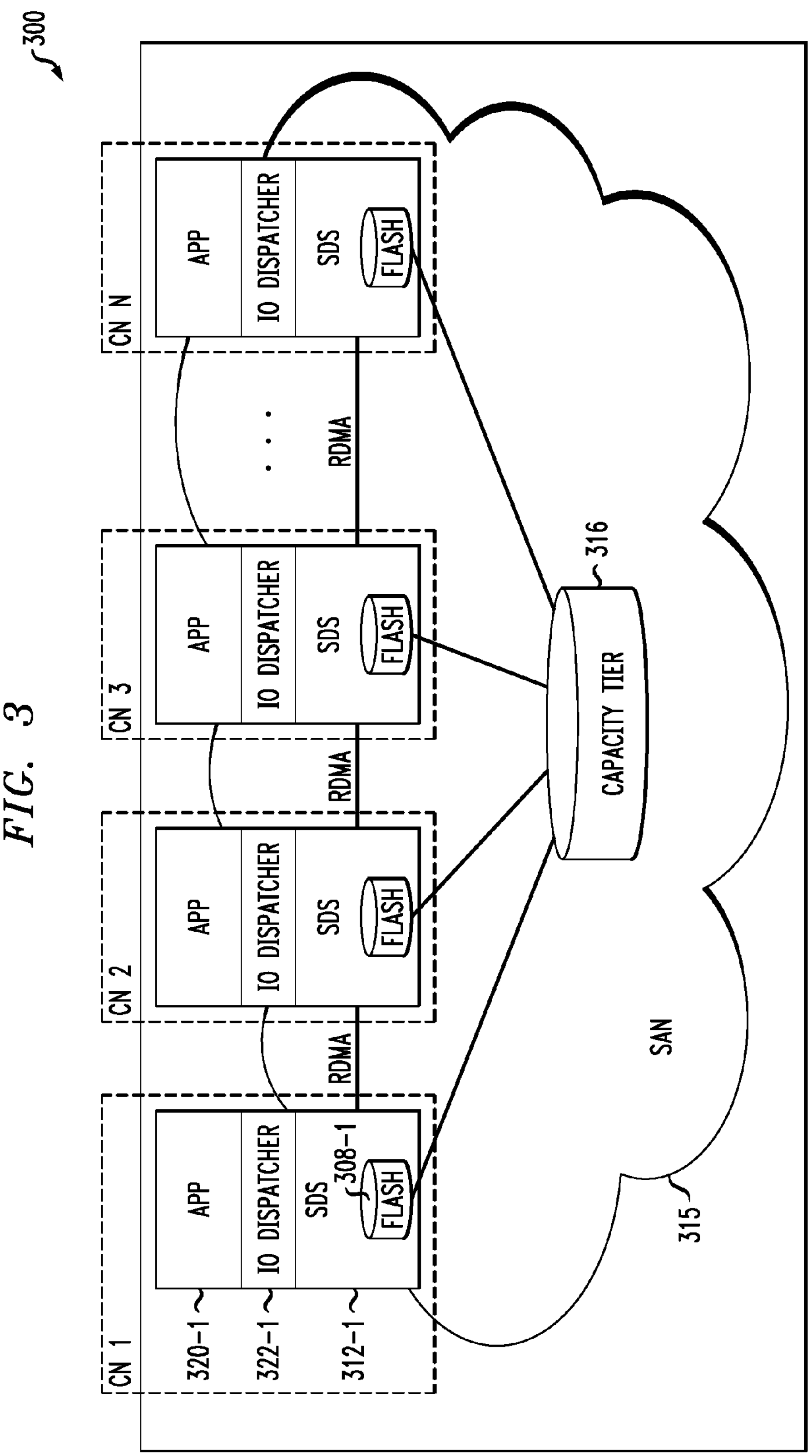
FIGS. 3 through 8 show respective additional illustrative embodiments of information processing systems comprising front-end storage tiers implemented using software-defined storage functionality.

Referring now to FIG. 3, an information processing system comprises a plurality of compute nodes CN 1, CN 2, . . . CN N. The first compute node CN 1 comprises an application 320-1, an IO dispatcher 322-1 and a software-defined storage (SDS) module 312-1. Each of the other compute nodes is similarly configured. The software-defined storage controller in this embodiment comprises the SDS modules implemented on respective ones of the compute nodes. The fast tier in this embodiment comprises flash memory 308-1 of the compute node CN 1 and similar flash memories from respective additional ones of the compute nodes CN 2 through CN N, as configured under the control of the software-defined storage controller comprising SDS modules implemented on respective ones of the compute nodes. Each of the compute nodes communicates over a SAN 315 with a capacity tier 316, illustratively using 10/40 Gb Ethernet connections.

It is assumed in this embodiment that the compute nodes are configured to communicate with one another over high-speed connections such as the above-noted RDMA connections. These RDMA connections are assumed to support data transfer between the memories 308 of the compute nodes using RDMA verbs.

An arrangement of this type makes it possible to implement a unified memory cluster that can achieve very low latencies on the order of 700 nanoseconds or less. Such reduced latencies considerably enhance the performance of in-memory data analytics functionality such as that implemented using SAP HANA or Tachyon.

As mentioned previously, the RDMA connections can be provided using interconnections associated with DSSD™ storage devices of a fast tier of a 2 TIERS™ storage system. Other embodiments can use other arrangements to provide RDMA connections supporting data transfer between compute nodes using RDMA verbs. For example, ScaleIO™ software can be extended to add support for RDMA verbs for clustering the data between the compute nodes. This may involve C++ translation of the ScaleIO™ code to recognize the lowest latency at each transfer but will typically not require any significant change to the ScaleIO™ software modules other than the libraries used.

Figure 4:
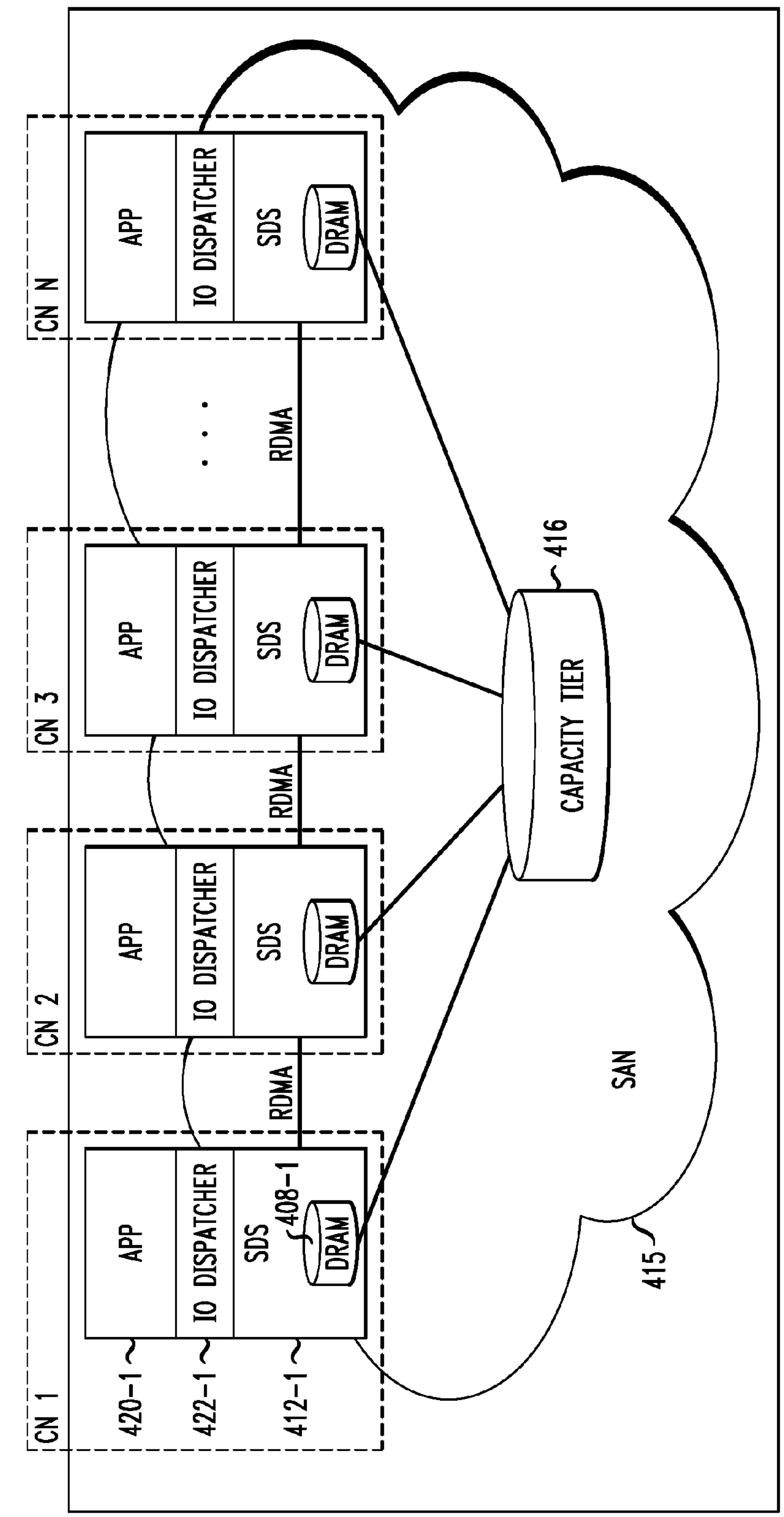

FIG. 4 shows another embodiment of an information processing system 400 comprising a plurality of compute nodes CN 1, CN 2, . . . CN N. The first compute node CN 1 comprises an application 420-1, an IO dispatcher 422-1 and an SDS module 412-1. Each of the other compute nodes is similarly configured. The software-defined storage controller in this embodiment comprises the SDS modules implemented on respective ones of the compute nodes. The fast tier in this embodiment comprises DRAM 408-1 of the compute node CN 1 and similar DRAMs from respective additional ones of the compute nodes CN 2 through CN N, as configured under the control of the software-defined storage controller comprising SDS modules implemented on respective ones of the compute nodes. Each of the compute nodes communicates over a SAN 415 with a capacity tier 416, illustratively using 10/40 Gb Ethernet connections. The operation of this embodiment is similar to the embodiment of FIG. 3, except that the fast tier in this embodiment comprises DRAMs of the respective compute nodes rather than flash memories of the respective compute nodes.

Figure 5:
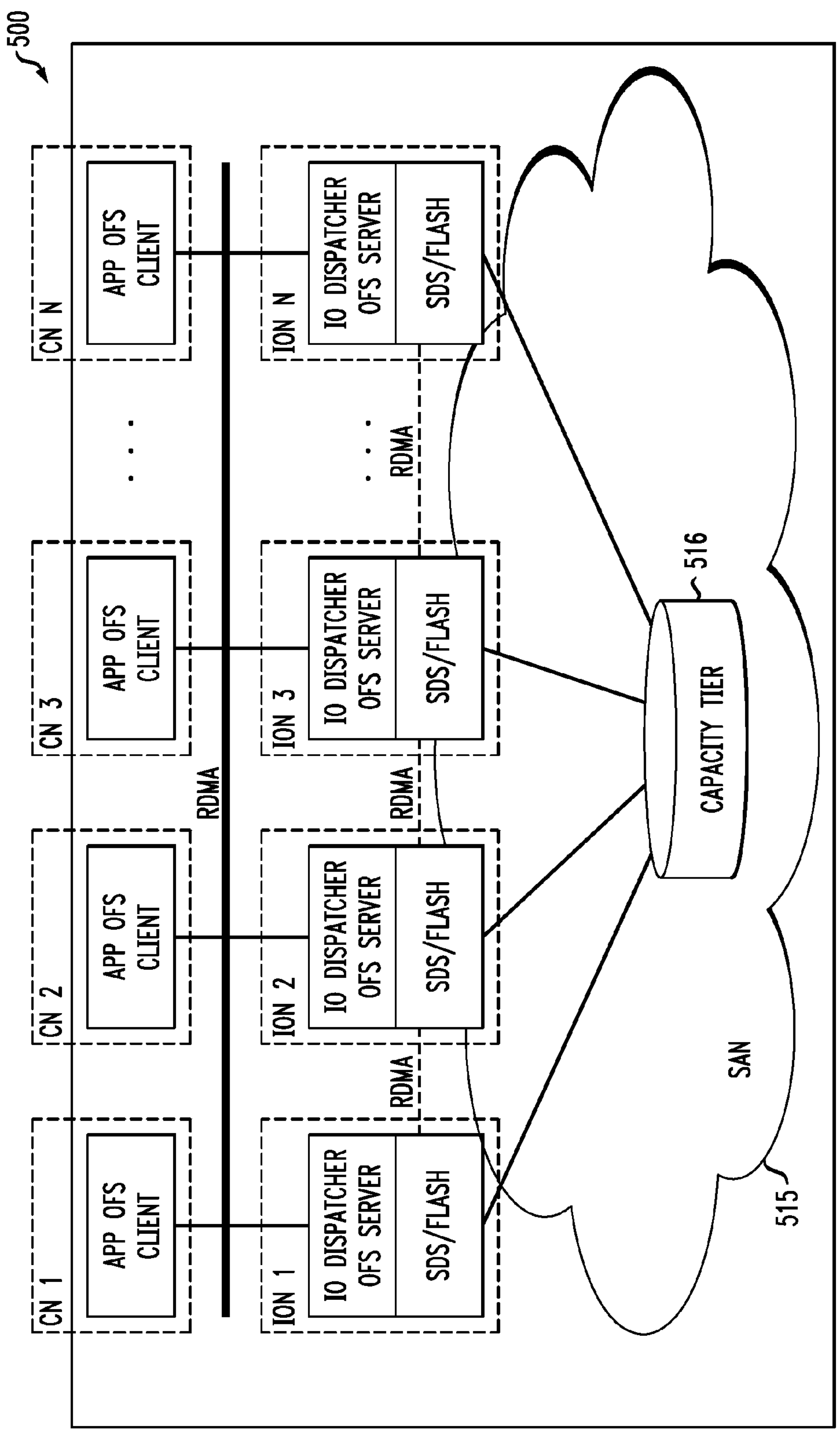

Another embodiment is shown in FIG. 5. In this embodiment, an information processing system 500 comprises a plurality of compute nodes CN 1, CN 2, . . . CN N having respective associated IO nodes ION 1, ION 2, . . . ION N. The compute nodes and the IO nodes are assumed to communicate with one another over RDMA connections using RDMA verbs. The first compute node CN 1 comprises an application and an Orange File System (OFS) client, and each of the other compute nodes is similarly configured. The first IO node ION 1 comprises an IO dispatcher, an OFS server, and an SDS module having associated flash memory. The software-defined storage controller in this embodiment comprises the SDS modules implemented on respective ones of the IO nodes.

The fast tier in this embodiment comprises the flash memory of the IO node ION 1 and similar flash memories from respective additional ones of the IO nodes ION 2 through ION N, as configured under the control of the software-defined storage controller comprising SDS modules implemented on respective ones of the IO nodes. Each of the IO nodes communicates over a SAN 515 with a capacity tier 516, illustratively using 10/40 Gb Ethernet connections. The operation of this embodiment is also similar to that of the embodiment of FIG. 3, except that the fast tier in this embodiment comprises flash memories of respective IO nodes rather than flash memories of the respective compute nodes, and the SDS modules are implemented on respective IO nodes instead of respective compute nodes.

Figure 6:
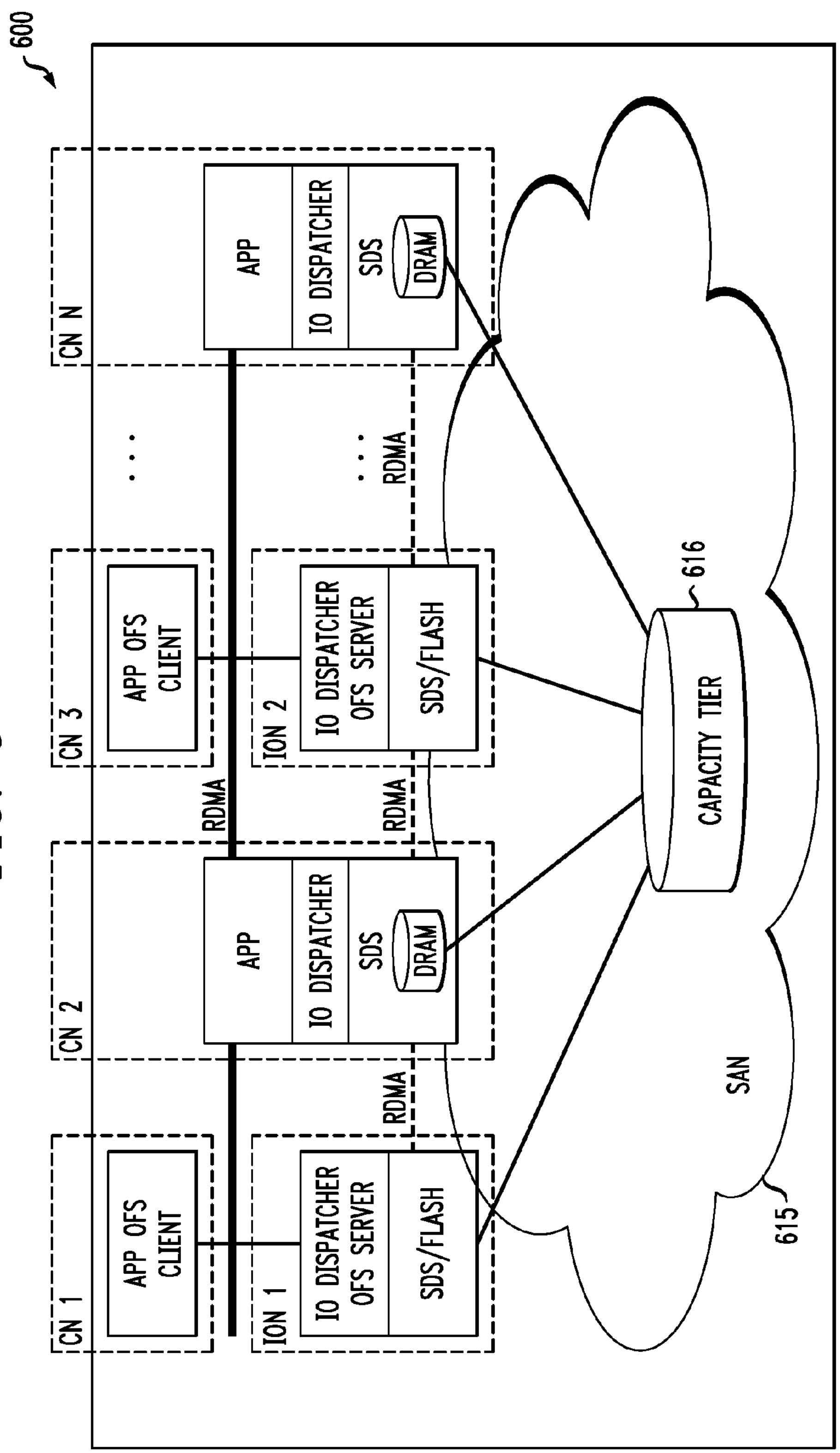

FIG. 6 shows an information processing system 600 having a mixture of compute nodes that have associated IO nodes and compute nodes that do not have associated IO nodes. For example, compute nodes CN 1 and CN 3 have respective associated IO nodes ION 1 and ION 2, while compute nodes CN 2 and CN N do not have associated IO nodes. The compute nodes and the IO nodes are assumed to communicate with one another over RDMA connections using RDMA verbs. The first compute node CN 1 comprises an application and an OFS client, and each of the other compute nodes having an associated IO node is similarly configured. The first IO node ION 1 comprises an IO dispatcher, an OFS server, and an SDS module having associated flash memory, and each of the other IO nodes is similarly configured. The second compute node CN 2 comprises an application, an IO dispatcher and an SDS module. The other compute nodes that do not have associated IO nodes are similarly configured. The software-defined storage controller in this embodiment comprises the SDS modules implemented on respective ones of the IO nodes as well as the SDS modules implemented on respective ones of the compute nodes that do not have associated IO nodes.

The fast tier in this embodiment comprises the flash memory of the IO node ION 1 and similar flash memories from respective additional ones of the IO nodes, and DRAMs of the respective compute nodes that do not have associated IO nodes. The fast tier is configured under the control of the software-defined storage controller comprising the SDS modules implemented on respective ones of the IO nodes as well as the SDS modules implemented on respective ones of the compute nodes that do not have associated IO nodes.

Each of the IO nodes ION 1 and ION 2 and the compute nodes CN 2 and CN N communicate over a SAN 615 with a capacity tier 616, illustratively using 10/40 Gb Ethernet connections. The operation of the information processing system 600 is similar to that of embodiments 3, 4 and 5 as previously described.

Figure 7:
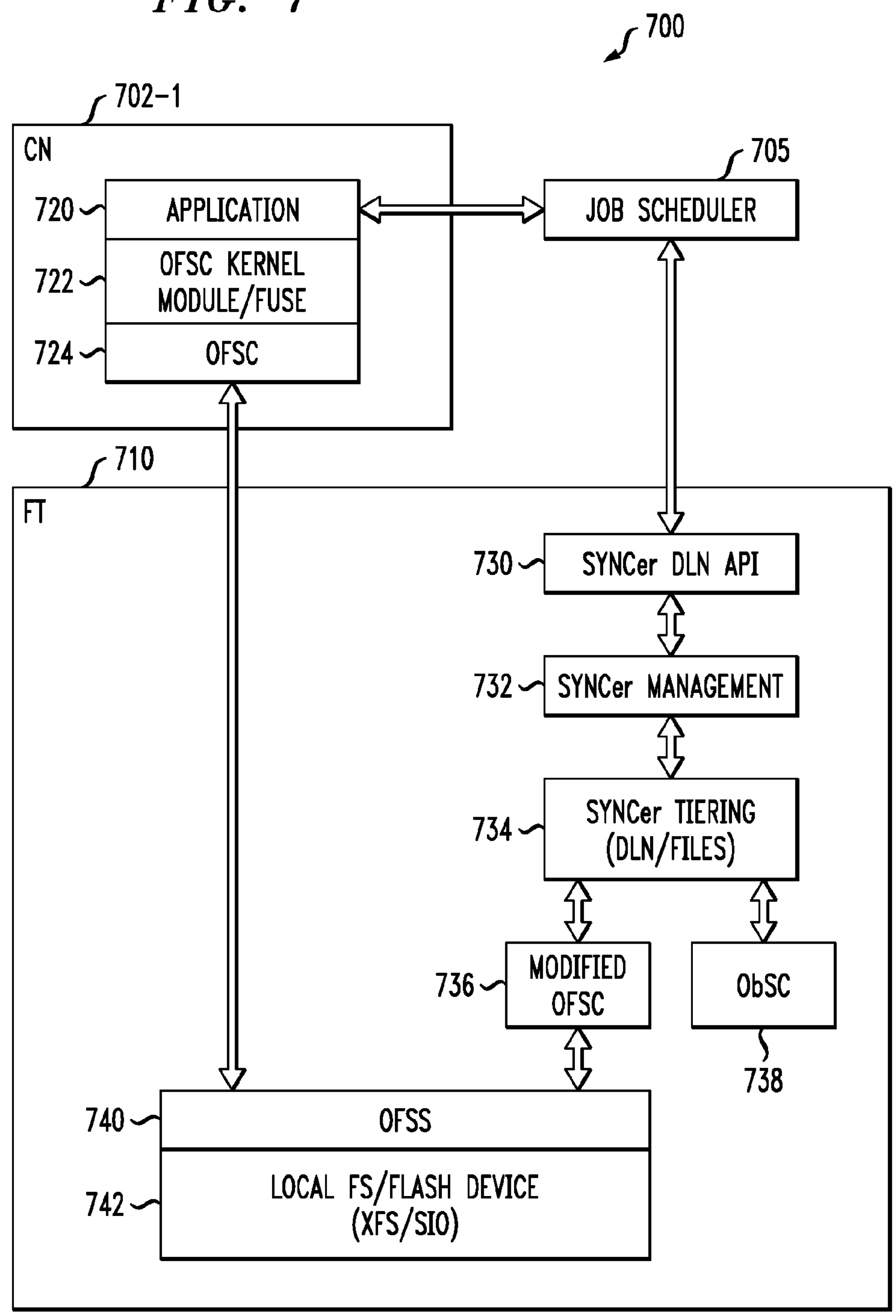

Referring now to FIG. 7, another information processing system 700 is shown. The information processing system comprises a compute node 702-1 that communicates with a fast tier 710. The compute node and fast tier are denoted CN and FT, respectively, in the figure. Also associated with compute node 702-1 and the fast tier 710 is a job scheduler 705. The job scheduler 705 is assumed to interact with other compute nodes not explicitly shown in the figure that also utilize the fast tier 710. It should be understood that the portions of the fast tier 710 utilized by the compute node 702-1 can be replicated for other compute nodes of the information processing system 700. The job scheduler 705 illustratively runs on a common processing platform with one or more of the compute nodes or at least portions of the fast tier. Alternatively, the job scheduler 710 can run on a separate processing platform.

Like the embodiments of FIGS. 5 and 6, the FIG. 7 embodiment utilizes OFS ("OrangeFS"), although other file systems can be used in other embodiments.

The compute node 702-1 illustratively comprises an application 720, an OFS client (OFSC) kernel module/FUSE component 722, and an OFSC 724. The component 722 in this embodiment can be either an OFSC kernel module or an OFSC FUSE, where FUSE denotes "file system in user-space."

The fast tier 710 comprises a synchronizer ("SYNCer") DLN application programming interface (API) 730, a SYNCer management component 732, and a SYNCer tiering component 732 for tiering of DLN objects and associated files. The SYNCer tiering component 734 interacts with a modified OFSC 736 and an object store client (ObSC) 738. The latter component is assumed to interface with an object store server of a capacity tier that is not explicitly shown in the figure.

The OFSC 724 of the compute node 702-1 interacts with an OFS server (OFSS) 740 of the fast tier 710. The modified OFSC 736 also communicates with the OFSS 740. The OFSS 740 provides an interface to the local file system and corresponding local flash device of the fast tier 710. The local file system and corresponding local flash device are collectively identified by reference numeral 742. The local file system is assumed to be an XFS file system and the flash device is assumed to be part of a unified memory cluster implemented as software-defined storage using ScaleIO™ as previously described herein. The corresponding software-defined storage module is also referred to as an SIO module, where SIO denotes ScaleIO™. The XFS file system, flash device and SIO module may be part of an IO node or other type of node that is separate from the compute node 702-1. Alternatively, these and possibly other elements of the fast tier 710 can be implemented within the compute node 702-1.

In the FIG. 7 embodiment, ScaleIO™ software-defined storage modules are used to cluster respective portions of the memories of multiple compute or IO nodes. OFS is a flexible parallel file system built on top of the local XFS file systems of the compute or IO nodes. OFS utilizes the local XFS file systems of the respective compute or IO nodes to store its trove objects. It is to be appreciated, however, that alternative file systems can be used in place of OFS and XFS in other embodiments.

The SYNCer components 730, 732 and 734 are utilized as data mover modules and are illustratively configured to move data between the OFS running on the compute or IO nodes and an object store of a capacity tier.

Although not explicitly illustrated in the figure, an OFS metadata server (MDS) is assumed to be implemented on a given compute or IO node, possibly utilizing a partition of the local flash device or a different directory in the local XFS file system.

The various components of the fast tier 710 that are associated with a given compute node or IO node are illustratively implemented in a corresponding LXC. Numerous alternative compute node or IO node configurations may be used.

In the event of a failure in one of the compute or IO nodes that provides a portion of the unified memory cluster of the fast tier 710, data mirrored by ScaleIO™ to one or more other neighboring nodes can be obtained quickly and easily in order to recover from the failure.

Figure 8:
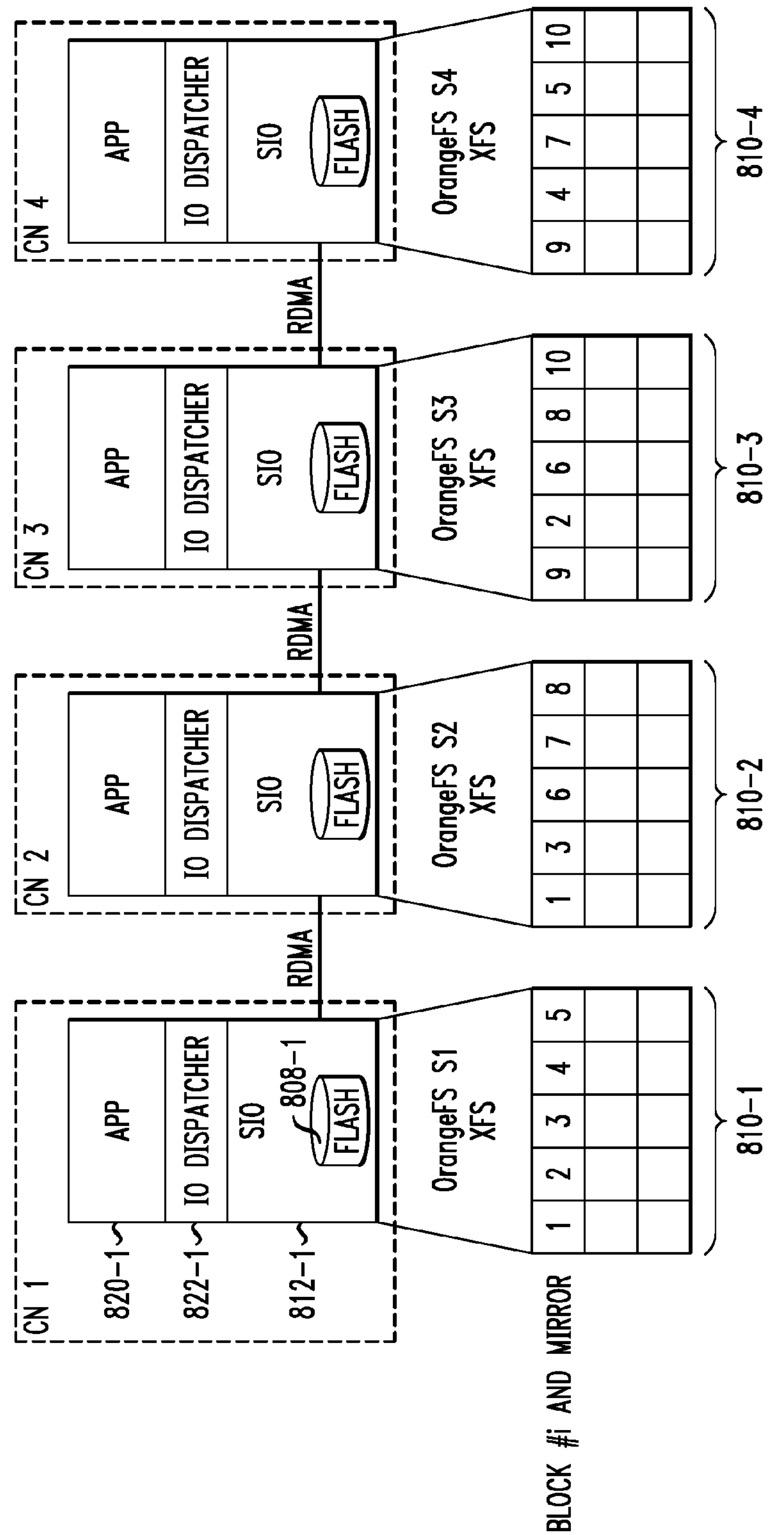

An example of such mirroring is shown in the illustrative embodiment of FIG. 8. In this embodiment, an information processing system 800 comprises four compute nodes CN 1, CN 2, CN 3 and CN 4. The first compute node CN 1 comprises an application 820-1, an IO dispatcher 822-1 and a software-defined storage module 812-1. The software-defined storage module 812-1 in this embodiment is assumed to be implemented using ScaleIO™ and is therefore denoted as an SIO module. Each of the other compute nodes CN 2, CN 3 and CN 4 is configured in a manner similar to compute node CN 1. The software-defined storage controller in this embodiment comprises the SIO modules implemented on respective ones of the compute nodes. The fast tier in this embodiment comprises flash memory 808-1 of the compute node CN 1 and similar flash memories from respective additional ones of the compute nodes CN 2 through CN 4, as configured under the control of the software-defined storage controller comprising SIO modules implemented on respective ones of the compute nodes.

Although not expressly shown in the figure, a capacity tier is assumed to be included in the system 800. Each of the compute nodes communicates with the capacity tier over at least one network.

It is also assumed in this embodiment that the compute nodes CN 1 through CN 4 are configured to communicate with one another over high-speed connections such as the above-noted RDMA connections. These RDMA connections are assumed to support data transfer between the memories 808 of the compute nodes using RDMA verbs.

The system 800 utilizes an OFS ("OrangeFS") parallel file system and local XFS file systems to store data blocks in the respective portions of the flash memories 808 of the compute nodes CN 1 through CN 4. The fast tier includes sets of data blocks S1, S2, S3 and S4 stored in respective ones of the flash memories 808 of the compute nodes CN 1 through CN 4. The stored data blocks of the set are arranged as shown at 810-1, 810-2, 810-3 and 810-4, which represent portions of the fast tier. The numerals shown in the data blocks of the first row of each set identify respective unique data blocks. Thus, for example, data blocks 1 and 3 stored on CN 1 are mirrored by the software-defined storage controller on CN 2. Similarly, data blocks 4 and 5 on CN 1 are mirrored on CN 4. Other data blocks stored on each of the compute nodes are mirrored on one or more of the other compute nodes in a like manner.

Mirroring of data blocks as illustrated in FIG. 8 can significantly reduce the performance impact of node failures. For example, in the event of a crash or other failure of an OFS server or other related component associated with one of the compute nodes CN 1 through CN 4, the needed data blocks can be obtained under the control of the software-defined storage controller from one or more other ones of the compute nodes. Such an arrangement considerably improves the availability of OFS within the system 800 and avoids the need to run file system check (FSCK) and related data corruption repair operations associated with recovery of a particular OFS server and remounting of its OFS clients.

As in other embodiments, portions of the system 800 associated with each compute node are illustratively implemented using respective containers. For example, each such container can include an OFS server, an associated local XFS file system and SIO module of the corresponding compute node. The SIO module illustratively comprises SYNCer components and possibly one or more other fast tier components of the type previously described in conjunction with the embodiment of FIG. 7. The migration of one or more containers in the event of corresponding node failures can be governed at least in part by the software-defined storage controller so as to ensure that the containers are moved to the best possible locations for accessing the needed replicated data blocks.

In one possible container-based implementation of the FIG. 8 embodiment, each of four containers running on respective ones of the compute nodes CN 1 through CN 4 can be configured to have access to different subsets of the data blocks. In the event of a failure of one of the compute nodes, the corresponding container can be migrated to one of the remaining compute nodes, with the needed subset of the data blocks being made available to the migrated container from those remaining compute nodes. Additional compute node failures can be accommodated in a similar manner.

It should be noted that one or more OFS MDSs can be deployed in a similar manner in order to provide enhanced availability of the OFS in the event of multiple node failures. The number of MDSs in some embodiments is assumed to be a particular fraction of the number of OFSSs, such as ⅛ the number of OFSSs. For example, in an embodiment with 36 fast tier nodes, four of the nodes may be used for MDSs and the remaining 32 of the nodes used for OFSSs. Alternatively, in an arrangement in which certain fast tier nodes implement both MDSs and OFSSs, one MDS can be shared by eight fast tier nodes that implement respective OFSSs. The fast tier nodes can be compute nodes, IO nodes associated with or separate from the compute nodes, or various combinations of these and other nodes. As mentioned previously, the term "IO node" is intended to encompass, for example, a data node or a metadata node.

It should be understood that the particular node and component configurations illustrated in FIGS. 3 through 8 are presented by way of illustrative example only, and should not be construed as limiting in any way. Numerous alternative configurations of front-end storage tiers, software-defined storage controllers, back-end storage tiers and other system elements can be used in other embodiments.

Illustrative embodiments disclosed herein can provide a number of significant advantages relative to conventional arrangements.

For example, one or more embodiments provide enhanced data access performance and scalability for front-end storage tiers of multi-tier storage systems. Some implementations can provide access latencies on the order of about 500 to 700 nanoseconds, while also supporting efficient scalability to hundreds or thousands of nodes.

Another advantage in some embodiments is an enhanced ability to recover from node failures. For example, one or more embodiments based on ScaleIO™ software-defined storage exhibit substantially faster failure recovery times than conventional implementations. A front-end storage tier implemented using ScaleIO™ can allow rapid access to the same data on a different server or other compute or IO nodes responsive to a failure in one of the servers or other compute or IO nodes.

Also, the use of containers to implement distributed modules and other components associated with a software-defined storage controller in some embodiments provides enhanced availability of a corresponding parallel file system of a multi-tier storage system while also facilitating migration of the functionality of a given container from one node to another in the event of a node failure.

These advantages are achieved in some embodiments without requiring expensive servers that each include very large memories, and therefore instead allow a given system to be configured using large numbers of smaller servers with less memory to form a unified memory cluster providing a single storage pool accessible to each of those servers.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, can be implemented as respective tenants of such a multi-tenant environment.

Back-end storage of a given system disclosed herein can also be implemented at least in part utilizing cloud infrastructure. Examples of cloud-based object stores that can be utilized for back-end storage in some illustrative embodiments include Amazon Web Services (AWS), Simple Storage Service (S3), Google Cloud Platform (GCP) Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102, fast tier 110, software-defined storage controller 112 and data mover modules 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage tiers, software-defined storage controllers, data mover modules and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:

a multi-tier storage system comprising at least a front-end storage tier and a back-end storage tier;

the storage system comprising a software-defined storage controller configured to implement the front-end storage tier as a unified memory cluster accessible to respective processors of a plurality of compute nodes;

wherein the unified memory cluster comprises portions of respective memories of one or more of the compute nodes and portions of respective memories of one or more input-output nodes that are associated with but separate from respective other ones of the compute nodes; and wherein the software-defined storage controller is implemented using at least one processing device comprising a processor coupled to a memory.

2. The apparatus of claim 1 wherein the portions of respective memories of the compute nodes or the associated input-output nodes comprise respective flash memories of those nodes.

3. The apparatus of claim 1 wherein the portions of respective memories of the compute nodes or the associated input-output nodes comprise respective dynamic random access memories of those nodes.

4. The apparatus of claim 1 wherein the compute nodes or the associated input-output nodes are configured to communicate with one another using remote direct memory access connections.

5. The apparatus of claim 1 wherein the unified memory cluster is expanded using an additional portion of the memory of one of the compute or the associated input-output nodes responsive to an overflow event associated with the memory of another one of the compute or the associated input-output nodes.

6. The apparatus of claim 1 wherein the unified memory cluster is configured to recover from a failure in the memory of one of the compute or the associated input-output nodes by obtaining corresponding data from the memory of another one of the compute or the associated input-output nodes.

7. The apparatus of claim 1 wherein the software-defined storage controller is implemented in a distributed manner so as to comprise software-defined storage modules implemented on at least one of:

at least a subset of the compute nodes; and one or more of the associated input-output nodes.

8. The apparatus of claim 7 wherein the software-defined storage modules are implemented in respective Linux containers running on respective ones of the compute nodes or the associated input-output nodes.

9. The apparatus of claim 7 wherein the software-defined storage controller comprises one or more software-defined storage modules implemented on respective ones of one or more of the compute nodes and one or more software-defined storage modules implemented on respective ones of one or more of the associated input-output nodes.

10. The apparatus of claim 1 wherein the back-end storage tier comprises at least one object store configured to store data in the form of objects having respective object identifiers and wherein a specified set of the objects is made accessible to an application running on a given one of the compute nodes via a corresponding dynamically loadable namespace identifier.

11. The apparatus of claim 10 wherein the dynamically loadable namespace identifier is associated with an a dynamically loadable namespace object stored in the object store of the back-end storage tier, the dynamically loadable namespace object comprising identifiers of respective ones of the objects in the specified set.

12. An information processing system comprising the apparatus of claim 1 and the plurality of compute nodes.

13. A method comprising:

configuring a back-end storage tier of a multi-tier storage system to include one or more object stores; and configuring a front-end storage tier of the multi-tier storage system as a unified memory cluster accessible to respective processors of a plurality of compute nodes;

wherein the unified memory cluster is implemented under the control of a software-defined storage controller of the storage system;

wherein the unified memory cluster comprises portions of respective memories of one or more of the compute nodes and portions of respective memories of one or more input-output nodes that are associated with but separate from respective other ones of the compute nodes; and wherein the configuring of the front-end and back-end storage tiers is performed by at least one processing device comprising a processor coupled to a memory.

14. The method of claim 13 further comprising dynamically modifying a size of the unified memory cluster under the control of the software-defined storage controller responsive to one or more designated conditions.

15. A non-transitory processor-readable storage medium having stored therein program code of one or more software programs, wherein the program code when executed by at least one processing device causes said processing device:

to configure a back-end storage tier of a multi-tier storage system to include one or more object stores; and to configure a front-end storage tier of the multi-tier storage system as a unified memory cluster accessible to respective processors of a plurality of compute nodes;

wherein the unified memory cluster comprises portions of respective memories of one or more of the compute nodes and portions of respective memories of one or more input-output nodes that are associated with but separate from respective other ones of the compute nodes; and wherein the unified memory cluster is implemented under the control of a software-defined storage controller of the storage system.

16. The non-transitory processor-readable storage medium of claim 15 wherein the program code when executed by at least one processing device further causes said processing device to dynamically modify a size of the unified memory cluster under the control of the software-defined storage controller responsive to one or more designated conditions.

17. The method of claim 13 wherein the software-defined storage controller is implemented in a distributed manner so as to comprise software-defined storage modules implemented on at least one of:

at least a subset of the compute nodes; and one or more of the associated input-output nodes.

18. The method of claim 17 wherein the software-defined storage modules are implemented in respective Linux containers running on respective ones of the compute nodes or the associated input-output nodes.

19. The method of claim 17 wherein the software-defined storage controller comprises one or more software-defined storage modules implemented on respective ones of one or more of the compute nodes and one or more software-defined storage modules implemented on respective ones of one or more of the associated input-output nodes.

20. The non-transitory processor-readable storage medium of claim 15 wherein the software-defined storage controller is implemented in a distributed manner so as to comprise software-defined storage modules implemented on at least one of:

at least a subset of the compute nodes; and one or more of the associated input-output nodes.

* * * * *